Patented Apr. 7, 1942

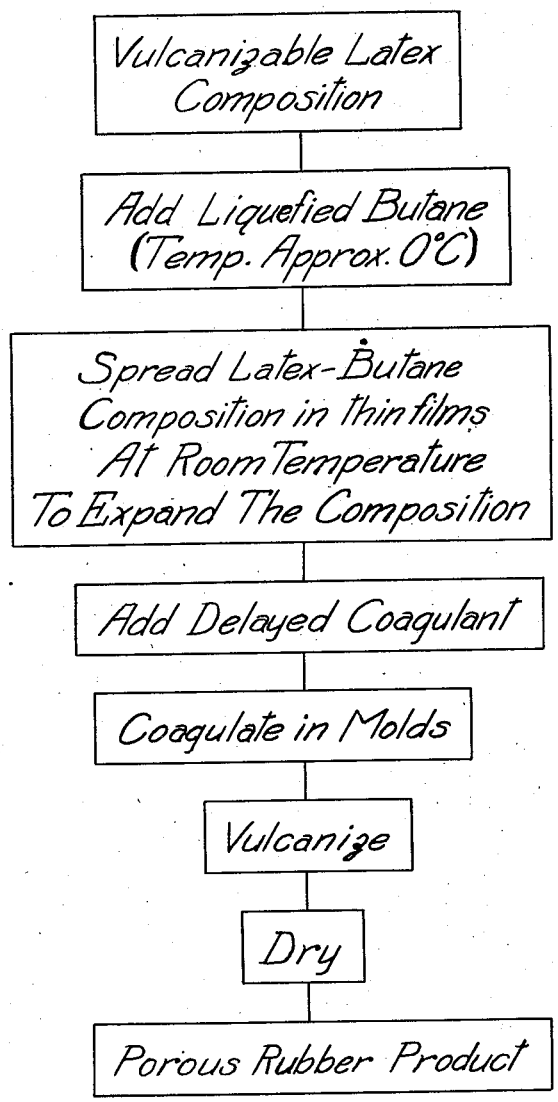

2,278,441

UNITED STATES PATENT OFFICE 2,278,441

METHOD OF MAKING POROUS RUBBER AND COMPOSITIONS EMPLOYED THEREIN

Marion M. Harrison and Louis P. Gould, Akron, Ohio, assignors to The B. F. Goodrich Company, New York, N. Y., a corporation of New York Application July 29, 1938, Serial No. 222,034

13 Claims. (Cl. 18—53)

The invention relates to the manufacture of porous rubber products and has for its chief objects the provision of simple, economical, and efficient methods of manufacturing sponge and other porous rubber products directly from liquid rubber latex and the elimination of the principal difficulties and disadvantages which have been encountered in the commercial practice of methods heretofore proposed for utilizing latex in the direct manufacture of porous spongy rubber products.

In the process of the present invention, liquid rubber latex is expanded to a porous state by means of an expanding agent incorporated in the latex, and the expanded latex is then permanently set in the expanded porous state as by coagulation and vulcanization of the expanded latex.

We have discovered that butane is a very effective agent for expanding latex and that mixtures of latex and butane exhibit certain extraordinary and entirely unexpected characteristics which have been utilized to provide what is believed to be the simplest, most practical, and generally most satisfactory method which has been devised for producing sponge rubber from latex. The invention contemplates both the novel mixture of latex and butane and the method employing such mixtures in the manufacture of sponge rubber.

Normal butane represented by the formula $C_4H_{10}$ is a gaseous hydrocarbon under ordinary conditions of temperature and pressure but can readily be condensed to a liquid having a boiling point variously reported as from $-0.6°$ C. to $1.0°$ C. at atmospheric pressure. If butane is added to liquid rubber latex under properly controlled conditions of lowered temperature or increased pressure, or both, the latex will absorb substantial quantities of the butane. If the conditions are thereafter changed to a condition of higher temperature or lowered pressure, or both, the butane will tend to increase in volume and expand the latex to a porous state. Surprisingly, however, a mixture of latex and butane in the bulk may be exposed to ordinary room conditions of temperature and pressure for long periods without any appreciable change taking place. The latex is not expanded appreciably and only insignificant quantities of butane are lost. Expansion of the latex may be effected by heating the mixture of latex and butane to elevated temperatures or by subjecting the mixture to vacuum but such expedients, although entirely feasible, involve some undesirable features and have not been adopted for commercial use. It has been found, however, that if a mixture of latex and butane at room temperature and pressure is merely spread in a thin film, the butane will expand the latex and produce an excellent uniform porous structure which may be set permanently by coagulation and vulcanization.

It has further been found that liquid butane at a temperature around $0°$ C. may be stirred into latex at room temperature and pressure without substantial loss of the butane upon mixture with the much warmer latex. It is therefore unnecessary to cool the latex or to utilize pressure in charging the latex with butane. The liquid butane ordinarily would be expected to boil immediately upon contact with the much warmer latex at a temperature approximately $25°$ C. above the boiling point of butane, and the amazing fact that such boiling is negligible and that the liquid butane may be mixed with latex at room temperature and stored for long periods in a closed container under ordinary conditions of temperature and pressure has not been satisfactorily explained. Such mixtures have been kept in a corked bottle for several months and then caused to expand simply by flowing the composition from the bottle onto a sloping surface.

These discoveries have been utilized in developing the present invention to provide a process in which the low-boiling, highly volatile, butane is added to latex in the bulk to provide a mixture which may be handled under ordinary room conditions of temperature and pressure without appreciable change taking place, but which can be caused to expand merely by spreading the mixture in a thin film to produce an excellent porous latex structure.

To further indicate the manner of practicing the invention, a specific example illustrative of a preferred embodiment of the invention will be set forth in considerable detail, although it is to be understood that the invention is by no means limited to such details, nor to the particular embodiment described.

To manufacture a sponge rubber product such as a seat cushion, a liquid rubber latex composition is first prepared by mixing 100 parts by weight of rubber added as the centrifugally concentrated latex of commerce containing about 60% total solids and .65% of ammonia as a preservative, together with 2.5 parts of sulfur, 1.0 part of an organic accelerator such as "Pip-pip", 1.0 part of titanium dioxide, 0.35 part of carbon black, 1.0 part of a commercial age-resister such as "Age-Rite White," and 0.4 part of potassium hydroxide or other stabilizing agent, the insoluble compounding ingredients being added as colloidal dispersions as in regular latex practice. The prepared latex composition preferably is allowed to stand for several days before using it as such aging appears to have some beneficial effect not yet understood.

To the prepared latex composition at room temperature (about 25° C.), liquid butane at a temperature around 0° C. is slowly added with gentle stirring comparable to stirring cream into coffee, the butane being added for example in the proportion of 15 c. c. of butane to each 100 parts of rubber, which is approximately 7.5% butane by weight based on the rubber content of the latex. As butane is an oily hydrocarbon immiscible with water, the latex should contain sufficient emulsifying agents to emulsify the butane, or, as usually proves to be more satisfactory, the emulsifying agent should be mixed with the butane before it is added to the latex. 2 cc. of a 35% aqueous solution of triethanolamine oleate in each 15 cc. of butane added is a satisfactory quantity. Other soaps or other well known emulsifying agents of course may be used in place of the triethanolamine oleate.

As has been indicated, the liquid butane does not boil away upon contact with the warmer latex, but is taken up and retained by the latex under ordinary conditions so long as the mixture is maintained in bulk.

The latex-butane mixture then is spread in a thin film as by flowing the mixture down a slightly inclined surface where, after a few minutes time, the latex will be expanded to a porous structure which can be scraped off the surface and poured or spread as hereinafter indicated. In commercial operations, a quantity of the latex-butane mixture may be placed in a horizontal, substantially closed cylinder and the cylinder rotated slowly to spread the mixture repeatedly upon the cylinder walls in thin films and so progressively to expand the entire bulk to the desired porous state. As the latex-butane mixture hereinabove described will multiply in volume about 750% upon expanding, the cylinder should contain initially only a small quantity of the unexpanded mixture. Simple and convenient apparatus may be provided by using a metal drum having a removable and replaceable head and placing the drum horizontally on rollers to effect the required rotation. The head of the drum should have a small aperture in the center to permit escape of gas and prevent accumulation of pressure within the drum during the expanding operation. In a typical case, about two gallons of the prepared latex-butane mixture should be placed in such a drum of about thirty gallons capacity and the drum should be rotated at a slow speed of about four or five revolutions per minute for about an hour, at room temperature of course, to effect maximum expansion of the latex. The drum will then be found to contain about fifteen gallons of pourable, spreadable latex in a highly uniform porous state.

There is then added to the expanded latex 5.0 parts by weight (to each 100 parts of rubber) of zinc carbonate to provide the zinc necessary for vulcanization. There is next added a quantity of any well-known "delayed coagulant" adequate to effect coagulation of the expanded latex after a desired time interval. For example about 2% of ammonium chloride by weight based on the weight of the batch may be added as a 20% water solution and mixed well with the expanded latex by thorough but gentle stirring. The mixture then is poured promptly into conventional molds which preferably are pre-treated with any well-known mold lubricant, and the molds are closed and allowed to stand at room temperature until the expanded latex is completely coagulated, which ordinarily will require about twenty to thirty minutes depending of course upon the character and quantity of delayed coagulant employed. The rubber then is vulcanized as by immersing the filled molds for a suitable time in water heated to an appropriate temperature. For the specific example hereinabove set forth, immersing the filled mold for seventy-five minutes in water heated to the boiling point by steady admission of steam will effect satisfactory vulcanization of the rubber. The molds are then opened and the vulcanized spongy rubber product is removed, washed, and dried, all according to conventional procedures.

The resulting product is a high quality sponge rubber article having fine pores of substantially uniform character, and having a density of about .140.

The room in which the process is carried out should be well ventilated and precautions should be taken to avoid all sparks and flames in order to prevent explosion of the highly inflammable butane.

The exemplary process hereinabove described is outlined in the accompanying drawing which sets forth, in flow-sheet style, the principal steps embodied in the particular process described. It should be understood, however, that the process described and outlined in the drawing represents only one embodiment of the invention chosen for purposes of illustration and that the invention is capable of embodiment in other processes differing in many respects from the specific procedure which has been illustrated and described.

Instead of molding the expanded latex to produce a sponge rubber article as hereinabove described, it may be utilized in any other manner in which such a spreadable pourable expanded latex has been used. For example, it may be poured or spread upon fabric or other sheet material or applied to other surfaces and then coagulated and vulcanized to provide porous coatings upon such surfaces. All such spongy articles and coatings may be vulcanized either to the soft rubber state or to the hard rubber state. Molded slabs of such porous rubber are excellent heat insulators. The invention promises to find wide use in the manufacture of seat cushions, mattresses, cushion pads of various types, and similar spongy articles. The extreme simplicity of the process adapts it to commercial manufacturing conditions and insures low manufacturing costs.

Numerous modifications and variations in details of the invention as hereinabove described may be made without departing from the spirit and scope of the discovery. Thus, in addition to the variations already indicated, iso-butane having a boiling point reported as from −11° C. to −10.6° C. may be used as the expanding agent instead of normal butane. The unmodified term "butane" in the claims accordingly includes both normal butane and iso-butane. The quantity of butane used may be varied widely with respect to the latex. Any well known vulcanizing, compounding, stabilizing, conditioning and preserving agents may be substituted for those specifically mentioned. Other well known coagulating agents active either at ordinary temperatures after the elapse of time or at elevated or lowered temperatures either immediately or after elapse of time may be employed in place of the ammonium chloride. Sodium silico fluoride, for example, is one well known excellent coagulating agent. The liquid rubber latex of course may be either a natural rubber latex or an artificially produced dispersion of rubber or rubber-like material. Although not essential, the latex may be cooled when the liquid butane is added to reduce somewhat the slight loss of butane which may occur. Instead of adding the butane in liquid form to the latex, gaseous butane may be admitted under a pressure of approximately 22 pounds per square inch to a closed chamber containing latex, preferably at a lowered temperature approximating the boiling point of butane. More simply, gaseous butane may be bubbled through latex maintained at a temperature near 0° C. All such methods effect a substantial impregnation of the latex with butane to produce a mixture useful in the manufacture of porous rubber. All such modifications and variations are within the scope of the invention as defined by the appended claims unless otherwise specifically indicated.

We claim:

1. A composition of matter comprising liquid rubber latex and butane.

2. A composition of matter comprising liquid rubber latex, an emulsifying agent, and butane emulsified in the latex.

3. A composition of matter comprising liquid rubber latex, vulcanizing agents, an emulsifying agent, and butane emulsified in the latex.

4. The method of making a porous rubber product which comprises adding butane to latex under conditions inhibiting expansion of the latex by the butane, altering the conditions to permit expansion of the latex by the butane to produce an expanded, porous latex structure, and setting the expanded latex in permanently porous form.

5. The method of making a porous rubber product which comprises adding butane to latex in the bulk, spreading the latex-butane mixture in a thin film to permit expansion of the latex by the butane to produce an expanded, porous latex structure, and setting the expanded latex in permanently porous form.

6. The method of making a porous rubber product which comprises adding liquid butane at atmospheric pressure to latex at a temperature substantially higher than the atmospheric pressure boiling point of the butane, spreading the mixture in a thin film to effect expansion of the latex to porous form, and setting the expanded latex in permanently porous form.

7. The method of making a porous rubber product which comprises adding liquid butane at atmospheric pressure to latex at a temperature substantially higher than the atmospheric pressure boiling point of the butane to provide a latex composition permeated with butane but which is stable for appreciable periods under ordinary conditions of temperature and pressure, and then altering the conditions to permit expansion of the latex by the butane to produce an expanded, porous latex structure, and setting the expanded latex in permanently porous form.

8. The method of making a porous rubber product which comprises admixing liquid butane into liquid rubber latex in the presence of an emulsifying agent to provide a latex-butane mixture which is stable for appreciable periods under ordinary conditions of temperature and pressure so long as the mixture is maintained in bulk form, and thereafter reducing the bulk of the mixture to effect expansion of the latex by the butane.

9. The method of making a porous rubber product which comprises admixing liquid butane into liquid rubber latex in the presence of an emulsifying agent to provide a latex-butane mixture which is stable for appreciable periods under ordinary conditions so long as the mixture is maintained in bulk form, and thereafter reducing the bulk of the mixture by spreading it in a thin film to effect expansion of the latex by the butane to produce an expanded, porous latex structure.

10. The method of making a porous rubber product which comprises admixing liquid butane into liquid rubber latex in the presence of an emulsifying agent to provide a latex-butane mixture which is stable for appreciable periods under ordinary conditions so long as the mixture is maintained in bulk form, and thereafter reducing the bulk of the mixture by placing a relatively small quantity of the mixture in a container of relatively large capacity and rotating the container to spread the mixture in thin films upon the container walls, whereby the latex is expanded to porous form.

11. The method which comprises admixing butane with liquid rubber latex in the presence of an emulsifying agent, placing a relatively small quantity of the resulting composition in a container of relatively large capacity, and rotating the container whereby the composition is spread in thin films on the container walls and is expanded by the butane to produce a porous latex product.

12. The method which comprises admixing with latex in the bulk an expanding agent which is not effective to expand latex in the bulk, and thereafter spreading the composition in a thin film to reduce the bulk of the composition and thereby to induce expansion of the latex to a porous state.

13. The method of making a molded sponge rubber article which comprises stirring liquid butane at atmospheric pressure into liquid rubber latex in the presence of an emulsifying agent, spreading the latex-butane mixture in a thin film to effect expansion of the latex to a pourable porous state, adding a delayed coagulating agent to the expanded latex, filling a mold with the resultant mixture, permitting the delayed coagulant to effect coagulation of the expanded latex, and then vulcanizing the porous rubber product.

MARION M. HARRISON.
LOUIS P. GOULD.